United States Patent
Choi et al.

(10) Patent No.: US 6,574,252 B1
(45) Date of Patent: Jun. 3, 2003

(54) RADIO FREQUENCY EXCITED SLAB WAVEGUIDE LASER COMPRISING DETECTOR AND METHOD OF STABILIZING THE LASER POWER AND FREQUENCY USING OPTOGALVANIC EFFECT

(75) Inventors: Jong Woon Choi, Taejon (KR); Dong Ju Shin, Taejon (KR); Young Boong Chung, Taejon (KR)

(73) Assignee: Korea Research Institute of Standards and Science, Taejon (KR)

( * ) Notice: Subject to any disclaimer, the term of this patent is extended or adjusted under 35 U.S.C. 154(b) by 139 days.

(21) Appl. No.: 09/716,139

(22) Filed: Nov. 17, 2000

(30) Foreign Application Priority Data

Nov. 19, 1999 (KR) .............................. 99-51575

(51) Int. Cl.[7] ................................................ H01S 3/13
(52) U.S. Cl. ..................................... 372/29.02; 372/32
(58) Field of Search ................................. 372/29.02, 32

(56) References Cited

U.S. PATENT DOCUMENTS 5,608,745 A * 3/1997 Hall et al. ..................... 372/26
5,717,708 A * 2/1998 Mells ............................ 372/32
6,084,893 A * 7/2000 Choi et al. .................... 372/32

* cited by examiner

Primary Examiner—Paul Ip
Assistant Examiner—Leith Al-Nazer
(74) Attorney, Agent, or Firm—McCormick, Paulding & Huber LLP

(57) ABSTRACT

There are provided a radio frequency excited slab waveguide laser and method of stabilizing the laser power and frequency using a detection circuit which uses a variation in an incident or reflecting radio frequency signal caused by an optogalvanic effect generated from the laser itself as a reference for the stabilization. The radio frequency excited slab waveguide laser having a radio frequency generator, an unstable resonator and a lock-in stabilizer further includes the detection circuit for detecting a current signal due to the optogalvanic effect generated from the unstable resonator itself to allow a signal detected by the detection circuit to be fed back to the lock-in stabilizer.

7 Claims, 5 Drawing Sheets

RADIO FREQUENCY EXCITED SLAB WAVEGUIDE LASER COMPRISING DETECTOR AND METHOD OF STABILIZING THE LASER POWER AND FREQUENCY USING OPTOGALVANIC EFFECT

BACKGROUND OF THE INVENTION

1. Field of the Invention

The present invention relates to a radio frequency excited slab waveguide laser comprising a detector and method of stabilizing the laser power and frequency using the optogalvanic effect, and more particularly to a radio frequency excited slab waveguide laser comprising a detector and method of stabilizing the laser power and frequency using the detector, which use a variation in incident or reflecting radio frequency signal depending on an optogalvanic effect generated from the laser itself as a reference for the stabilization. Especially, the present invention comprises the steps of splitting radio frequency energy with high power, inputted for powering a laser medium gas and a weak signal reflected from each other by an optogalvanic effect; detecting them in order to stabilize the laser power and frequency by using the detected signals.

2. Description of the Related Art

A laser generates electromagnetic waves shorter than that of which is created by an optical maser, though they have the same principle. The laser is generated by such a process in which a laser medium is put between two reflection mirrors of a cavity and energy such as radio frequency is induced thereto to generate a laser beam, and this beam is repeatedly reflected between the reflection mirrors, formed in opposite directions to each other to be amplified, thereby being stimulated-emitted. The laser is classified into the gas laser, solid-state laser, liquid laser, ion laser, ruby laser, He—Ne layer, nitrogen laser, semiconductor layer, etc. according to kinds of laser medium.

The laser is generally called as a beam because its frequency is higher than microwaves, which does not disperse and travels straight without interference, so that it is widely used for optical communication, multiplex communication, space communication, etc. Further, a focused laser beam is used for processing refractory materials since it can concentrate a large amount of energy on a very small range. Frequency of the laser depends on an interval between the two reflection mirrors, which constitute a cavity of the laser. In accordance with above principle, the stabilization of the laser power and frequency is achieved when the above interval, namely, cavity length, is kept constant. However, the cavity length may be minutely changed due to the thermal expansion or by vibrations that would cause troubles on stabilization of the laser power and frequency.

In order to keep the cavity length be constant during its correspondence with the variation in the cavity length caused by the thermal expansion or vibrations, said two conventional methods are used as representative examples for a radio frequency-excited slab-wave guide laser in which includes a radio frequency generator 1, connected to an impedance matching circuit 2, which is for powering a laser, an unstable resonator 3 which is configured of a slab waveguide 6 having a medium, such that is excited by the radio frequency provided by the radio frequency generator 1, a slab laser reflection mirror 5 located at one side of the slab waveguide 6 and a slab laser output mirror 41 placed on the other side of the slab waveguide 6, being opposite to the slab laser reflecting mirror 5, a piezo electric transducer 7 located on back of the slab laser output mirror 4, and a lock-in stabilizer 8 for applying a signal for a vibration of the piezoelectric transducer 7.

The first stabilization method is that the piezoelectric transducer 7 is attached to the slab laser reflection mirror 5, constituting one side of the unstable resonator, and it is vibrated by 520 Hz approximately. Then, the cavity length varies within the range of said vibration numbers, such that output of the laser is oscillated due to the variation of the cavity lengths. And the output of the laser gets split by means of an optical splitter, and it is partially transmitted to an optical detector. The transmitted oscillating signal is detected with the optical detector, such that it is subsequently used as a reference signal for stabilization of the laser power and frequency. The theoretical basis of this method using the piezoelectric transducer 7 is as follows.

The oscillating frequency and power of a gas laser using a Fabry-Perot cavity depend on an optical length of the cavity. Here, the optical length means an interval between the slab laser reflection mirror 5 and the output mirror where the repeated reflection of laser beam substantially occurs. Accordingly, in order to stabilize the oscillating frequency and power of the laser, it is important to prevent the optical length of the cavity from being affected by the environment where the laser is used. Otherwise, a variation in the optical length of the cavity should be compensated for. In other words, the optical length of unstable resonator 3, which may vary depending on the environment involving a variation in ambient temperature around a discharge tube used, mechanical vibrations, and a variation in the pressure of laser gas used, should be kept constant.

A variation in laser radiation flux occurring in the unstable resonator 3 results in variations in laser beam intensity, spectrum distribution, gas pressure, discharge current, and discharge impedance. In this regard, when vibrations of a certain frequency (for example, 522 Hz) are applied to the piezo electric transducer 7 attached to the back of the slab laser reflection mirror 5 located on the optical axis of the unstable resonator 3, the optical length of the unstable resonator 3 vibrates at the above frequency. The intensity of laser beam is modulated at the same frequency as that of the cavity length, along a laser gain characteristic. When the average mode frequency of the laser beam intensity being modulated is lower than the central frequency of the same laser beam intensity, the laser beam intensity has a phase opposite to that of the impedance variation. On the other hand, where the average mode frequency is higher than the central frequency, the impedance variation increases correspondingly to a difference of the mode frequency from the central frequency. In such a way, a considerable variation in the radio frequency discharge impedance occurs even when a slight variation in laser beam intensity occurs in the laser cavity. For instance, an intensity variation of only 1% results in a considerable variation in the radio frequency discharge impedance corresponding to about 0.1%. Based on such an impedance variation in the unstable resonator 3, a variation in incident or reflecting radio frequency energy is detected. Based on the detected signal, the lock-in stabilizer 8 generates an error signal that is, in turn, fed back to the piezo electric transducer. In such a way, stabilization of the laser power and frequency is carried out.

In the second stabilization method, a high-voltage direct current (DC) discharge tube is arranged in the unstable resonator in place of the optical detector used in the first stabilization method. In this case, an oscillating signal generated from the discharge tube is used as a reference signal for the laser power and frequency stabilization. Further, there was a method of which attenuates all laser outputs with a level higher than a minimum power using an optical attenuator arranged outside the laser. The above conventional stabilization methods are disclosed in U.S. Pat. Nos. 4,694,458, 4,856,010, 4,972,425, 6,084,893.

However, the stabilization method, in which a reference signal for stabilization is generated based on a signal split from an output from the laser by the optical splitter, involves a reduction in laser power because the laser output is partially used. Furthermore, since the optical splitter is arranged on the optical path of the laser, it is difficult to obtain an accurate optical axis alignment for the optical splitter. In addition, a variation in the transverse mode of the laser may occur.

The stabilization method, in which the high-voltage DC discharge tube is additionally arranged in the cavity so as to use an oscillating signal generated from the discharge tube as a reference signal, involves the degradation in the oscillation efficiency of the laser due to the provision of the discharge tube.

In addition, the above two methods involve a complex laser arrangement resulting in a frequent failure in laser operation. This brings about an increase of costs.

In the case of the method, in which an attenuator is arranged outside the laser to obtain a stabilized laser power, the degradation in laser efficiency occurs because the laser power is optionally attenuated. Similar to the above-mentioned methods, the laser arrangement is complex because of the use of the additional unit. As a result, an increase in costs occurs.

SUMMARY OF THE INVENTION

It is, therefore, an object of the present invention to provide a radio frequency excited slab waveguide laser comprising a detector and method of stabilizing the laser power and frequency using the detector, which are adapted to lock the laser power and frequency of the laser at the vertex of a laser gain curve using an optogalvanic effect generated from the laser itself, without requiring any specific unit to be arranged inside or outside the unstable resonator of the laser, to use a variation in incident or reflecting radio frequency signal depending on the optogalvanic effect as a reference for the stabilization.

To accomplish the object of the present invention, there is provided a radio frequency excited slab waveguide laser comprising a detection circuit, which comprises: a radio frequency generator for powering a laser; an unstable resonator configured of a slab waveguide having a medium to be excited by the radio frequency provided by the radio frequency generator, a slab laser reflection mirror located at one side of the slab waveguide and a slab laser output mirror placed at the other side of the slab waveguide, being opposite to the slab laser reflecting mirror; a piezo electric transducer located back of the slab laser output mirror; and a lock-in stabilizer for applying a signal for a vibration of the piezoelectric transducer, wherein the detection circuit for detecting a current signal caused by an optogalvanic effect generated from the unstable resonator itself is coupled with a connection line connecting the radio frequency generator and the slab waveguide to each other, and a signal from the detection circuit is fed back to the lock-in stabilizer.

The detection circuit is coupled with the connection line, which connects the radio frequency generator and the unstable resonator to each other, in such a manner that an antenna coupler is located around the connection line. The detection circuit may be coupled to the connection line in such a manner that an inductor coupler is located around the connection line. The detection circuit may be electrically coupled to the connection line via a capacitor. Otherwise, the detection circuit is electrically coupled to the connection line via a bi-directional coupler in such a manner that the detection circuit is connected to a traveling wave output part or reflected wave output part of the bi-directional coupler.

To accomplish the object of the present invention, there is also provided a method for stabilizing power and frequency of a radio frequency excited slab waveguide laser using a detection circuit, the laser comprising: a radio frequency generator for powering a laser; an unstable resonator configured of a slab waveguide having a medium to be excited by the radio frequency provided by the radio frequency generator, a slab laser reflection mirror located at one side of the slab waveguide and a slab laser output mirror placed at the other side of the slab waveguide, being opposite to the slab laser reflecting mirror; a piezo electric transducer located back of the slab laser output mirror; and a lock-in stabilizer for applying a signal for a vibration of the piezo-electric transducer, wherein the detection circuit for detecting a current signal caused by an optogalvanic effect generated from the unstable resonator itself is coupled with a connection line connecting the radio frequency generator and the slab waveguide to each other, and a signal from the detection circuit is fed back to the lock-in stabilizer, the method comprising the steps of: measuring a signal detected by the detection circuit; comparing the detected signal with a reference signal of the lock-in stabilizer; generating an error signal obtained from the difference between the detected signal and the reference signal; and feeding back the error signal to the lock-in stabilizer.

DETAILED DESCRIPTION OF THE PREFERRED EMBODIMENT

Figure 1:
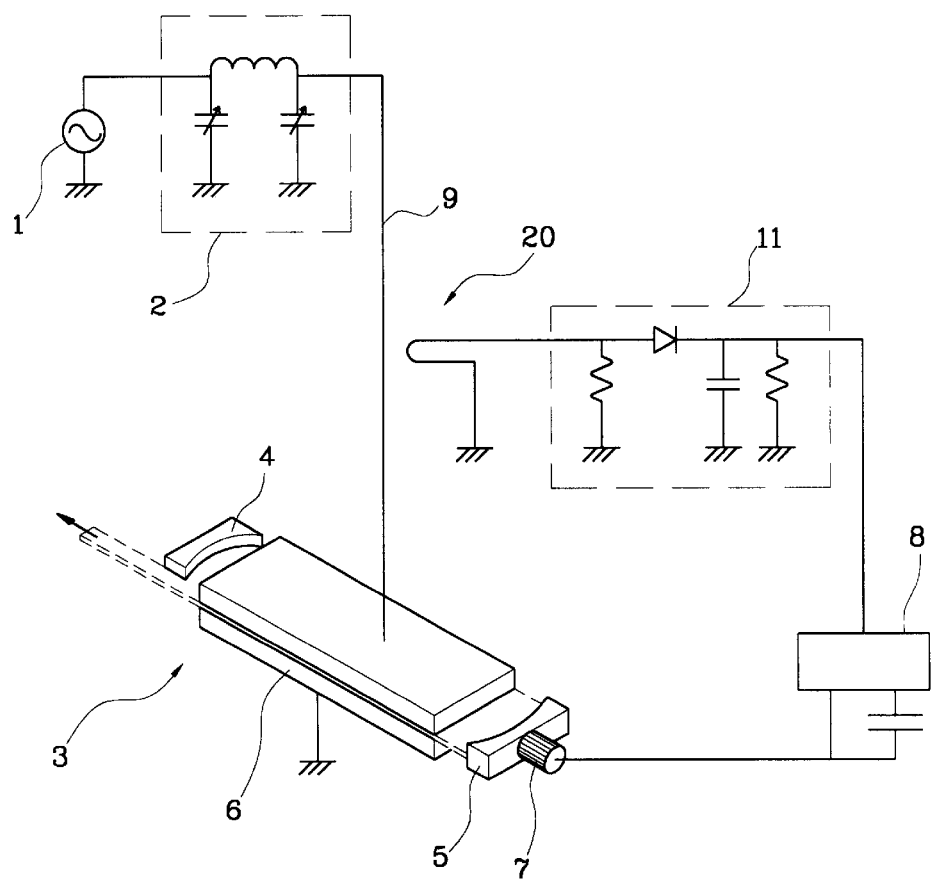
FIG. 1 illustrates the configuration of a radio frequency excited slab waveguide laser comprising a detector according to a first embodiment of the present invention.

Reference will now be made in detail to the preferred embodiments of the present invention, examples of which are illustrated in the accompanying drawings.

As shown in FIGS. 1 to 5, the radio frequency excited slab-waveguide laser having a detector 11 of the present invention includes a radio frequency generator 1 for powering a laser, an unstable resonator 3 which is configured of a slab waveguide 6 having a medium to be excited by the radio frequency provided by the radio frequency generator 1, a slab laser reflection mirror 5 located at one side of the slab waveguide 6 and a slab laser output mirror 41 placed at the other side of the slab waveguide 6, being opposite to the slab laser reflecting mirror 5, a piezo electric transducer 7 located back of the slab laser output mirror 4, and a lock-in stabilizer 8 for applying a signal for a vibration of the piezoelectric transducer 7, in which the detection circuit 11 for detecting a current signal caused by the optogalvanic effect generated from the unstable resonator 3 itself is coupled with a connection line 9 connecting the radio frequency generator 1 to the slab waveguide 6, and a signal from the detection circuit 11 is fed back to the lock-in stabilizer 8.

The detection circuit 11 which is connected to the connection line 9 to be used for detecting a weak current signal induced to the connection line 9 divides the current signal caused by the optogalvanic effect in the unstable resonator 3 from a radio frequency signal with high energy, which is commercially available to be understood by those related with the art. The current signal induced to the detection circuit 11 is generated by the laser oscillator itself depending on the optogalvanic effect and this signal is applied to conductors such as the connection line 9 connected to the laser oscillator. The detection circuit 11 detects this current signal. Based on the detected signal, the lock-in stabilizer 8 generates an error signal that is, in turn, fed back to the piezo electric transducer 7. In such a way, stabilization of the laser power and frequency is carried out.

Figure 2:
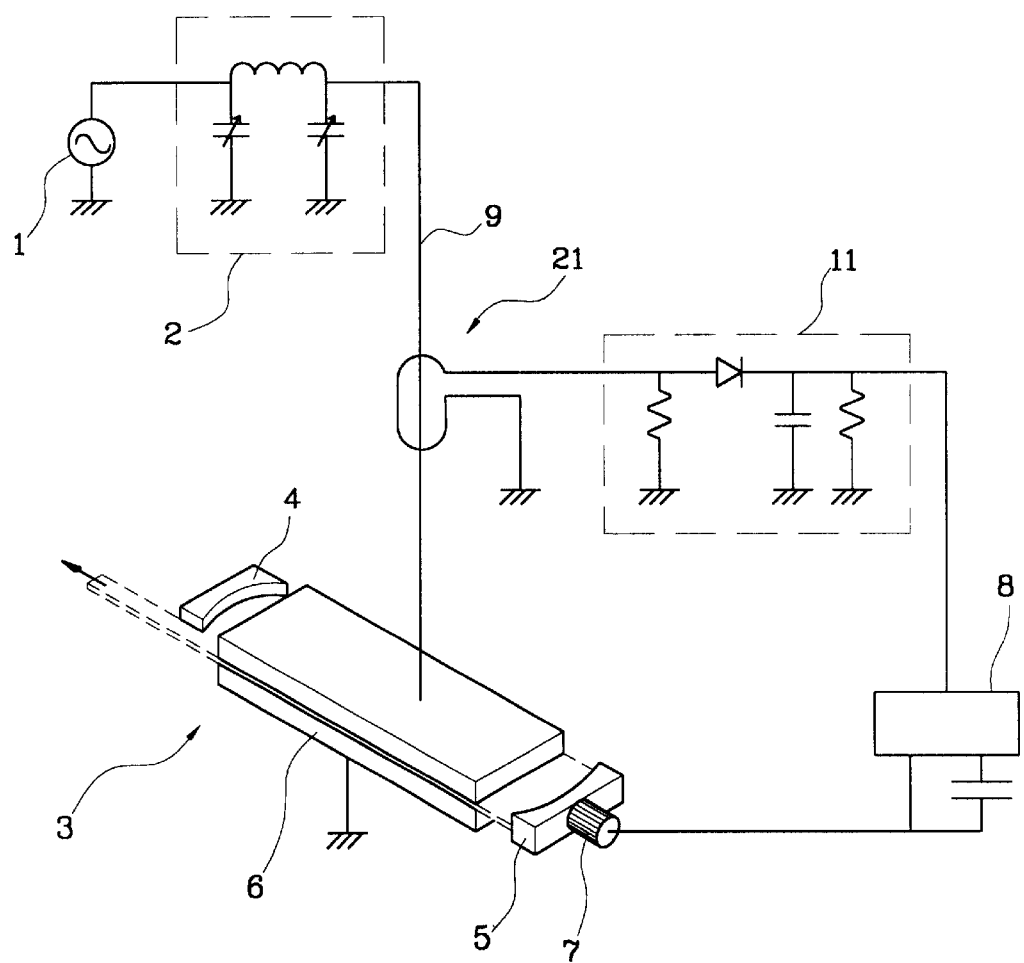
FIG. 2 illustrates the configuration of a radio frequency excited slab waveguide laser comprising a detector according to a second embodiment of the present invention.

The connection of the detection circuit 11 to the connection line 9 can be accomplished, as shown in FIGS. 1 and 2, in such a manner that an antenna coupler 20 or inductor coupler 21 is located around the connection line 9 connecting the radio frequency generator 1 and unstable resonator 3 to each other. Here, a current is induced into the antenna coupler 20 or the coil of the inductor coupler 21 according to the current signal caused by the optogalvanic effect, which flows along the connection line 9. The detection circuit 11 detects this induced current. The connection of the detection circuit 11 using the antenna coupler 20 or inductor coupler 21 can be simply carried out because the detection circuit is not directly coupled to the connection line 9 constituting the laser oscillator. In addition, this configuration can easily detect the induced current when radio frequency with high energy is applied to the connection line 9 in case of a high power laser.

Figure 3:
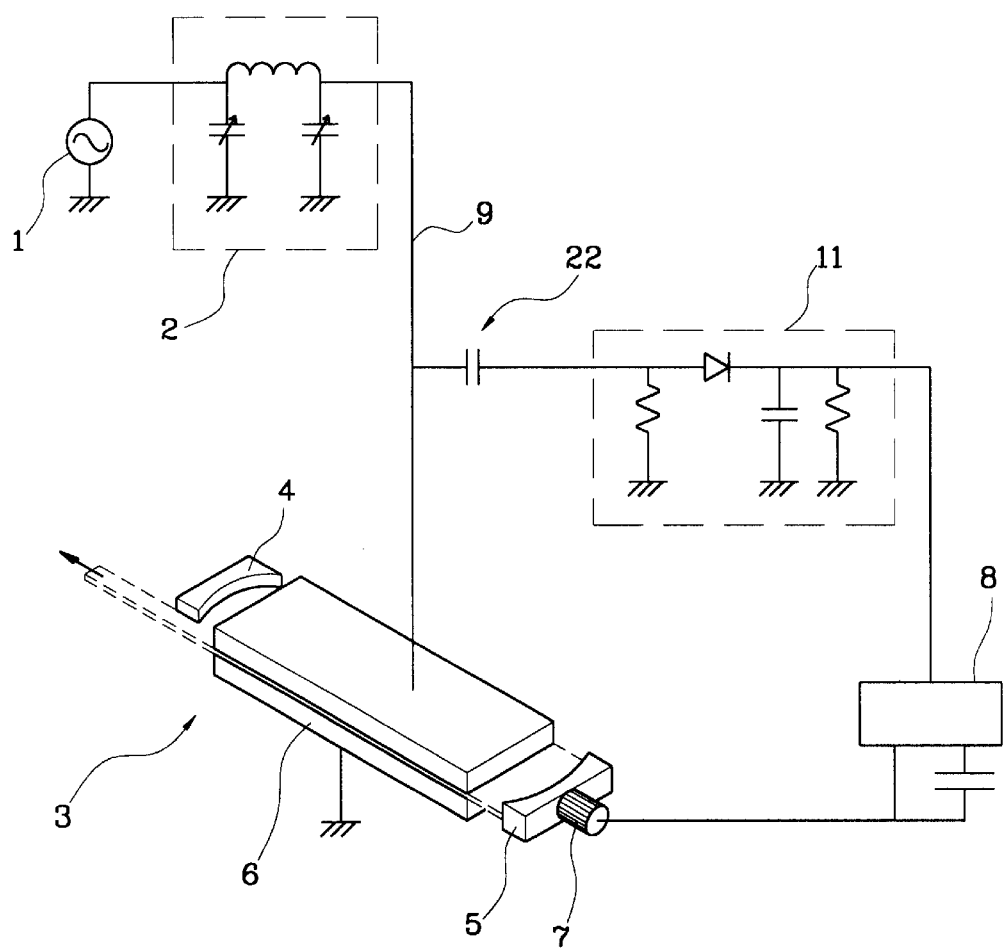
FIG. 3 illustrates the configuration of a radio frequency excited slab waveguide laser comprising a detector according to a third embodiment of the present invention.

Meanwhile, the detection circuit 11 can be electrically connected to the connection line 9 which connects the unstable resonator 3 to the radio frequency generator 1 by way of a capacitor 22, as shown in FIG. 3. This configuration can detect the current signal caused by the optogalvanic effect even if the current signal is weak because the detection circuit 11 is directly coupled to the connection line 9.

Figure 4:
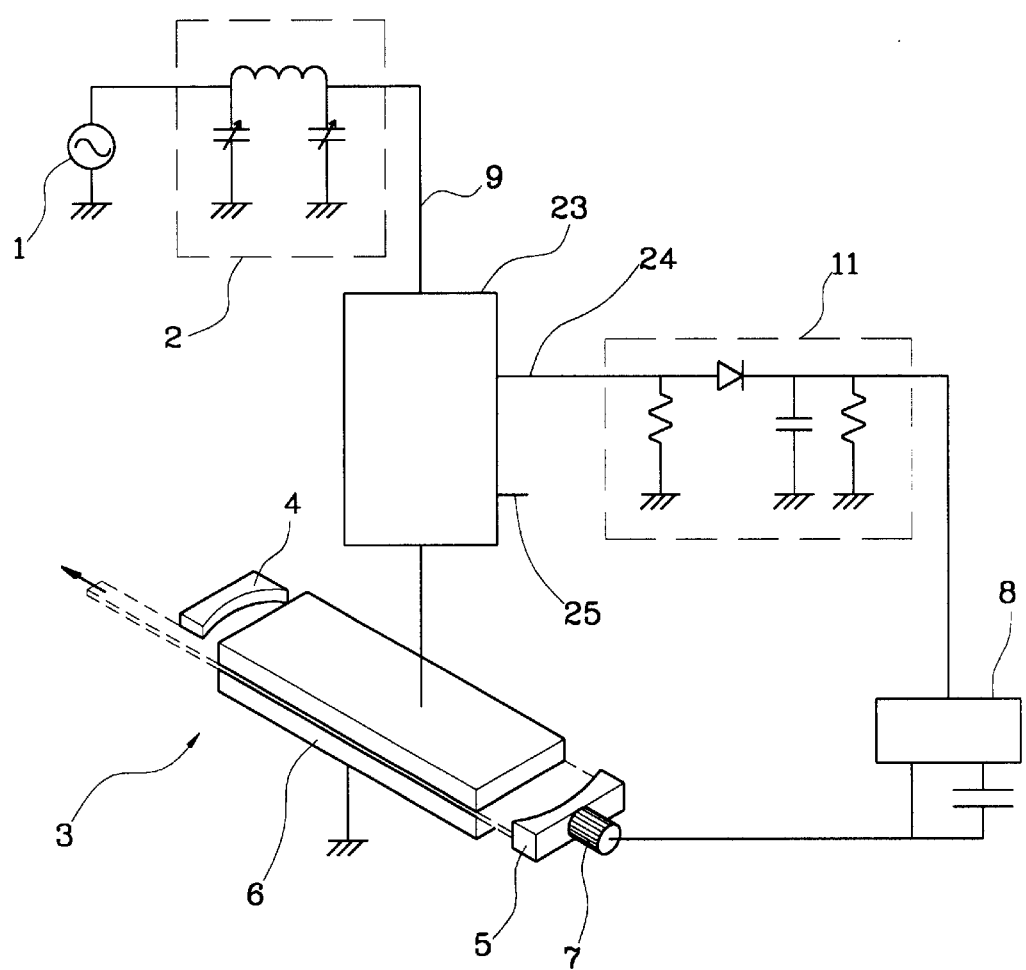
FIG. 4 illustrates the configuration of a radio frequency excited slab waveguide laser comprising a detector according to a fourth embodiment of the present invention.
Figure 5:
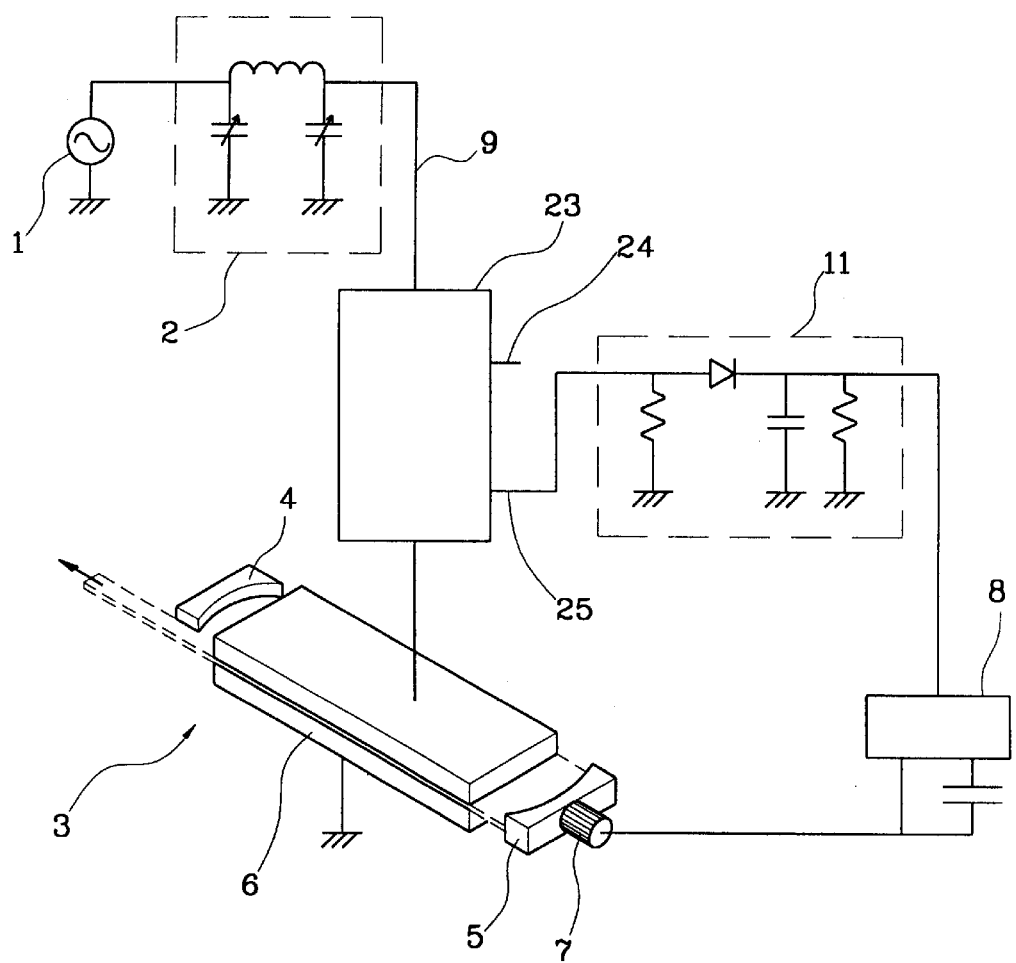
FIG. 5 illustrates the configuration of a radio frequency excited slab waveguide laser comprising a detector according to a fifth embodiment of the present invention.

Referring to FIG. 4, the detection circuit 11 can be coupled to the connection line 9 connecting the radio frequency generator 1 and unstable resonator 3 to each other through electrical connection via a bi-directional coupler 2. Here, the detection circuit 11 is connected to a traveling wave output part 24 of the bi-directional coupler 23. Otherwise, the detection circuit 11 and the connection line 9 can be electrically connected to each other through the bi-directional coupler 23 in a manner that the detection circuit 11 is coupled with a reflected wave output part 25 of the bi-directional coupler 23, as shown in FIG. 5. The bi-directional coupler 23 outputs voltages respectively proportional to incident and reflected radio frequency energy values, and its operation principle and fabrication method are disclosed in U.S. Pat. No. 3,426,298 applied by Carl G. Sontheimer and Raymond E. Fredrick (Feb. 4, 1969), which hereby is incorporated by reference in its entirety.

The aforementioned configurations of the invention can solve the problems of the conventional stabilization method in which a reference signal for stabilization is generated based on a signal split from an output from the laser by the optical splitter. That is, the stabilization method of the invention can prevent a reduction in the laser power and solve problems of a difficulty in accurate optical axis alignment for the optical splitter and a variation in the transverse mode of the laser.

There is described the method for stabilizing power and frequency of a laser using the detection circuit 11 according to the present invention. In the radio frequency excited slab waveguide laser having the detector 1 which includes a radio frequency generator 1 for powering a laser, an unstable resonator 3 which is configured of a slab waveguide 6 having a medium to be excited by the radio frequency provided by the radio frequency generator 1, a slab laser reflection mirror 5 located at one side of the slab waveguide 6 and a slab laser output mirror 41 placed at the other side of the slab waveguide 6, being opposite to the slab laser reflecting mirror 5, a piezo electric transducer 7 located back of the slab laser output mirror 4, and a lock-in stabilizer 8 for applying a signal for a vibration of the piezoelectric transducer 7, in which the detection circuit 11 for detecting a current signal caused by the optogalvanic effect generated from the unstable resonator 3 itself is coupled with a connection line 9 connecting the radio frequency generator 1 to the slab waveguide 6, and a signal from the detection circuit 11 is fed back to the lock-in stabilizer 8, the stabilization method includes a detection step of measuring the signal detected by the detection circuit 11, a comparison step of comparing the detected signal with a reference signal of the lock-in stabilizer 8, a signal generation step of generating an error signal obtained from the difference between the detected signal and the reference signal, and a feedback step of feeding back the error signal to the lock-in stabilizer 8.

In the detection step where the detection circuit 11 connected to the connection line 9 detects the current signal due to the optogalvanic effect generated from the unstable resonator 3 itself, a signal is sampled which is fed back to the lock-in stabilizer 8 to vibrate the piezo electric transducer 7 without addition of a separate optical splitter to the unstable resonator 3 in the radio frequency excited slab waveguide laser comprising the detection circuit 11 of the present invention.

In the comparison step, the detected current signal sampled in the detection step is compared with the reference signal of the lock-in stabilizer 8 to generate the error signal to be fed back to the lock-in stabilizer 8. The signal generation step generates the error signal obtained from the difference between the detected signal and the reference signal, and the feedback step feeds back this error signal to the lock-in stabilizer 8. Though the laser power and frequency stabilization method using the detection circuit 11 has been explained by steps, the operations of these steps are simultaneously are carried out.

As described above, in the radio frequency excited slab waveguide laser comprising the detector 11 according to the present invention, the detection circuit 11 is coupled with the connection line 9 to detect the current signal output from the laser oscillator, which is caused by the optogalvanic effect, this detected signal is compared with the reference signal of the lock-in stabilizer 8 and the error signal between the detected signal and the reference signal is fed back to the lock-in stabilizer 8, thereby vibrating the piezo electric transducer 7 with the number of vibrations automatically compensated for. Accordingly, the optical length of the unstable resonator 3 has a uniform average value according to the vibration of the piezo electric transducer 7 to achieve a laser with stabilized power and frequency.

According to the present invention, a laser having stabilized power and frequency can be realized without having problems such as a reduction in the laser power, a difficulty in accurate optical axis alignment for the optical splitter and a variation in the transverse mode of the laser which occur in the conventional stabilization method in which a reference signal for stabilization is generated based on a signal split from an output from the laser by the optical splitter.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A stabilizing apparatus for stabilizing the laser power and frequency of a radio frequency excited laser using an optogalvanic effect, the apparatus comprising:

a radio frequency generator for powering a laser;

an unstable resonator electrically connected to the radio frequency generator through a connection line;

a lock-in stabilizer electrically connected to the unstable resonator;

a detection circuit electrically connected to the lock-in stablilzer; and a coupler electrically connected to the detection circuit, and indirectly coupling the detection circuit with the connection line;

wherein the detection circuit detects a signal caused by an optogalvanic effect generated from the unstable resonator, and in response to the optogalvanic effect the detection circuit generates a feedback signal which is fed back to the lock-in stabilizer.

2. The stabilizing apparatus of claim 1 wherein the coupler is an antenna coupler located proximate the connection line to electrically couple the detection circuit with the connection line.

3. The stabilizing apparatus of claim 1 wherein the coupler is a coil wound around the connection line to inductively couple the detection circuit with the connection line.

4. The stabilizing apparatus of claim 1 wherein the unstable resonator includes:

a slab waveguide having a medium to be excited by the radio frequency provided by the radio frequency generator;

a slab laser reflection mirror located at one side of the slab waveguide; and a slab laser output mirror located at an opposing side of the slab waveguide.

5. The stabilizing apparatus of claim 4 comprising:

a piezo electric transducer located back of the slab laser reflection mirror, and electrically connected between the unstable resonator and the lock-in stabilizer;

wherein the lock-in stabilizer generates a signal to induce vibration of the piezoelectric transducer.

6. A method of stabilizing laser output power and frequency of a radio frequency excited laser using an optogalvanic effect, the method comprising:

generating a radio frequency signal for powering a laser;

transmitting the radio frequency signal through a connection line to an unstable resonator;

generating a laser output signal in response to the radio frequency signal from the unstable resonator;

generating an optogalvanic current signal caused by an optogalvanic effect from the unstable resonator through the connection line;

indirectly coupling the connection line to a detection circuit through a coupler; and generating a feedback signal from the detection circuit in response to the optogalvanic current signal to stabilize the laser output signal.

7. The method of claim 6 comprising:

transmitting the feedback signal to a lock-in stabilizer;

generating a stabilizer signal from the lock-in stabilizer to a piezoelectric transducer in response to the feedback signal; and inducing vibration of a piezoelectric transducer in response to the stabilizer signal to stabilize the laser output signal.

* * * * *